(12) United States Patent
Kilgard et al.

(10) Patent No.: US 8,773,439 B2
(45) Date of Patent: Jul. 8, 2014

(54) APPROXIMATION OF STROKED HIGHER-ORDER CURVED SEGMENTS BY QUADRATIC BÈZIER CURVE SEGMENTS

(75) Inventors: Mark J. Kilgard, Austin, TX (US); Henry Packard Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 40 days.

(21) Appl. No.: 13/098,102

(22) Filed: Apr. 29, 2011

(65) Prior Publication Data

US 2011/0285722 A1    Nov. 24, 2011

Related U.S. Application Data

(60) Provisional application No. 61/347,359, filed on May 21, 2010.

(51) Int. Cl.
    *G06T 11/20*    (2006.01)
(52) U.S. Cl.
    USPC .......................................... 345/442; 345/443
(58) Field of Classification Search
    None
    See application file for complete search history.

(56) References Cited

U.S. PATENT DOCUMENTS

| | | | | |
|---|---|---|---|---|
| 5,731,820 | A * | 3/1998 | Broekhuijsen | 345/442 |
| 5,774,133 | A | 6/1998 | Neave et al. | |
| 5,818,459 | A * | 10/1998 | Kurumida | 345/442 |
| 6,201,549 | B1 * | 3/2001 | Bronskill | 345/441 |
| 6,271,861 | B1 | 8/2001 | Sargent et al. | |
| 6,295,072 | B1 * | 9/2001 | Pon et al. | 345/442 |
| 6,384,822 | B1 | 5/2002 | Bilodeau et al. | |
| 6,819,332 | B2 | 11/2004 | Baldwin | |
| 7,167,181 | B2 | 1/2007 | Duluk et al. | |
| 7,184,040 | B1 | 2/2007 | Tzvetkov | |
| 7,355,602 | B1 | 4/2008 | Kilgard et al. | |
| 7,403,208 | B1 | 7/2008 | Bastos et al. | |
| 7,408,553 | B1 | 8/2008 | Toksvig et al. | |
| 7,499,055 | B2 | 3/2009 | Lin et al. | |
| 7,684,641 | B1 | 3/2010 | Toksvig | |
| 7,737,983 | B2 | 6/2010 | Brothers et al. | |
| 7,847,798 | B1 | 12/2010 | Parenteau et al. | |
| 7,868,887 | B1 | 1/2011 | Yhann | |

(Continued)

OTHER PUBLICATIONS

Loop et al. "Resolution Independent Curve Rendering using Programmable Graphics Hardware", Association for Computing Machinery, Inc. 2005, pp. 1000-1009.*

(Continued)

*Primary Examiner* — Kee M Tung
*Assistant Examiner* — Nicholas R Wilson
(74) *Attorney, Agent, or Firm* — Patterson + Sheridan, LLP

(57) ABSTRACT

One embodiment of the present invention sets forth a technique for subdividing stroked higher-order curved segments into quadratic Bèzier curve segments. Path stroking may be accelerated when a GPU or other processor is configured to perform the subdivision operations. Cubic Bèzier path segments are subdivided into quadratic Bèzier curve segments and other lower-order segments at key features. The quadratic Bèzier curve segments approximate the cubic Bèzier path segments. A variance metric is computed for each quadratic Bèzier curve segment, and when the variance metric indicates that the quadratic Bèzier curve segment deviates by more than a threshold from the corresponding portion of the cubic Bèzier path segment, the quadratic Bèzier curve segment is further subdivided. The path composed of the quadratic Bèzier curve segments is then stroked by rendering hull geometry that encloses the path.

17 Claims, 13 Drawing Sheets

(56) References Cited

U.S. PATENT DOCUMENTS

| | | | |
|---|---|---|---|
| 7,872,648 | B2 | 1/2011 | Hoppe et al. |
| 7,928,984 | B1 | 4/2011 | Yhann et al. |
| 8,044,955 | B1 | 10/2011 | Yhann |
| 8,044,956 | B1 | 10/2011 | Kilgard |
| 8,063,914 | B1 | 11/2011 | Miller et al. |
| 8,072,452 | B1 | 12/2011 | Brown |
| 8,264,503 | B1 | 9/2012 | Parenteau et al. |
| 8,379,025 | B1 | 2/2013 | Carr et al. |
| 2002/0075492 | A1 | 6/2002 | Lee |
| 2002/0194436 | A1 | 12/2002 | McKenney |
| 2003/0164842 | A1 | 9/2003 | Oberoi et al. |
| 2004/0233195 | A1 | 11/2004 | Bunnell |
| 2006/0232603 | A1 | 10/2006 | Schuster et al. |
| 2007/0109318 | A1 | 5/2007 | Tuomi |
| 2007/0211061 | A1 | 9/2007 | Kokojima |
| 2008/0122866 | A1 | 5/2008 | Dorbie et al. |
| 2008/0198168 | A1 | 8/2008 | Jiao et al. |
| 2010/0002003 | A1 | 1/2010 | Yamauchi |
| 2010/0097382 | A1 | 4/2010 | Nystad et al. |
| 2010/0097383 | A1* | 4/2010 | Nystad et al. ............... 345/442 |
| 2010/0097388 | A1 | 4/2010 | Nystad et al. |
| 2010/0110093 | A1 | 5/2010 | Nystad et al. |
| 2010/0149181 | A1 | 6/2010 | Lee et al. |
| 2010/0185949 | A1 | 7/2010 | Jaeger |
| 2010/0225660 | A1 | 9/2010 | Robart |
| 2011/0090228 | A1 | 4/2011 | Persson |

OTHER PUBLICATIONS

Lee et al. "A Bezier Curve-based Approach to Shape Description for Chinese Calligraphy Characters". 2001. IEEE.*

Blinn, Jim. "Jim Blinn's Corner Notation, Notation, Notation". 2003, Elsevier Inc. Chapter 16, p. 219-229.*

Stone, Maureen c., DeRose, Tony D. "A Geometric Characterization of Parametric Cubic Curves". ACM Transactions on Graphics, vol. 8, No. 3, Jul. 1989, p. 147-163.*

Farouki, et al. "Algebraic properties of plane offset curves", Elsevier Science Publishers B.V. (North-Holland) 1990, pp. 101-127.

Warnock, et al. "A Device Independent Graphics Imaging Model for Use with Raster Devices", Computer Graphics vol. 16, No. 3, Jul. 1982, pp. 313-319.

Loop, et al. "Resolution Independent Curve Rendering using Programmable Graphics Hardware", Association for Computing Machinery, Inc., 2005, pp. 1000-1009.

Kokojima, et al. "Resolution Independent Rendering of Deformable Vector Objects using Graphics Hardware", Toshiba Corp. (email: yoshiyuki.kokojima@toshiba.co.jp), one page.

Rueda, et al. "GPU-based rendering of curved polygons using simplicial coverings" Elsevier Computers & Graphics Journal 32, 2008 pp. 581-588.

Non-Final Office Action for U.S. Appl. No. 13/097,483 dated Jun. 14, 2013.

Benstead, Luke, et al., "Beginning OpenGL Game Programming, Second Edition,"Mar. 13, 2009, Course Technology PTR, pp. 245-249.

Non-Final Office Action for U.S. Appl. No. 13/097,993 dated May 30, 2013.

Nehab, Diego, and Hugues Hoppe. "Random-access rendering of general vector graphics." ACM Transactions on Graphics (TOG). vol. 27. No. 5, ACM, 2008.

Wikipedia, Blend Modes, http://en.wikipedia.org/wiki/Blend_modes, last modified Mar. 7, 2013, retrieved Mar. 27, 2013.

Non-Final Office Action for U.S. Appl. No. 13/109,763 dated Mar. 4, 2013.

Final Office Action for U.S. Appl. No. 13/109,763 dated Jun. 14, 2013.

Advisory Action for U.S. Appl. No. 13/109,763 dated Aug. 26, 2013.

Non-Final Office Action for U.S. Appl. No. 13/111,897 dated Jul. 29, 2013.

Non-Final Office Action for U.S. Appl. No. 13/110,777 dated May 14, 2013.

Non-Final Office Action for U.S. Appl. No. 13/111,148 dated Jun. 4, 2013.

Non-Final Office Action for U.S. Appl. No. 13/112,874 dated Apr. 8, 2013.

Final Office Action for U.S. Appl. No. 13/112,874 dated Aug. 1, 2013.

Advisory Action for U.S. Appl. No. 13/112,874 dated Oct. 10, 2013.

Non-Final Office Action for U.S. Appl. No. 13/100,938 dated Nov. 7, 2013.

* cited by examiner

PRIOR ART

APPROXIMATION OF STROKED HIGHER-ORDER CURVED SEGMENTS BY QUADRATIC BÈZIER CURVE SEGMENTS

CROSS-REFERENCE TO RELATED APPLICATIONS

This application claims priority benefit to U.S. provisional patent application titled, "Path Rendering," filed on May 21, 2010 and having Ser. No. 61/347,359. This related application is also hereby incorporated by reference in its entirety.

BACKGROUND OF THE INVENTION

1. Field of the Invention

The present invention generally relates to graphics processing and more specifically to approximation of stroked higher-order curved segments by quadratic segments.

2. Description of the Related Art

Path rendering is a style of resolution-independent two-dimensional (2D) rendering, often called "vector graphics," that is the basis for a number of important rendering standards such as PostScript, Java 2D, Apple's Quartz 2D, OpenVG, PDF, TrueType fonts, OpenType fonts, PostScript fonts, Scalable Vector Graphics (SVG) web format, Microsoft's Silverlight and Adobe Flash for interactive web experiences, Open XML Paper Specification (OpenXPS), drawings in Office file formats including PowerPoint, Adobe Illustrator illustrations, and more.

Path rendering is resolution-independent meaning that a scene is described by paths without regard to the pixel resolution of the framebuffer. This is in contrast to the resolution-dependent nature of so-called bitmapped graphics. Whereas bitmapped images exhibit blurred or pixilated appearance when zoomed or otherwise transformed, scenes specified with path rendering can be rendered at different resolutions or otherwise transformed without blurring the boundaries of filled or stroked paths.

Sometimes the term vector graphics is used to mean path rendering, but path rendering is a more specific approach to computer graphics. While vector graphics could be any computer graphics approach that represents objects (typically 2D) in a resolution-independent way, path rendering is a much more specific rendering model with salient features that include path filling, path stroking, path masking, compositing, and path segments specified as Bèzier curves.

FIG. 1A is a prior art scene composed of a sequence of paths. In path rendering, a 2D picture or scene such as that shown in FIG. 1A is specified as a sequence of paths. Each path is specified by a sequence of path commands and a corresponding set of scalar coordinates. Path rendering is analogous to how an artist draws with pens and brushes. A path is a collection of sub-paths. Each sub-path (also called a trajectory) is a connected sequence of line segments and/or curved segments. Each sub-path may be closed, meaning the sub-path's start and terminal points are the same location so the stroke forms a loop; alternatively, a sub-path can be open, meaning the sub-path's start and terminal points are distinct.

When rendering a particular path, the path may be filled, stroked, or both. As shown in FIG. 1A, the paths constituting the scene are stroked. When a path is both filled and stroked, typically the stroking operation is done immediately subsequent to the filling operation so the stroking outlines the filled region. Artists tend to use stroking and filling together in this way to help highlight or offset the filled region so typically the stroking is done with a different color than the filling.

FIG. 1B is the sequence of paths shown in FIG. 1A with only filling. Filling is the process of coloring or painting the set of pixels "inside" the closed sub-paths of a path. Filling is similar to the way a child would "color in between the lines" of a coloring book. If a sub-path within a path is not closed when such a sub-path is filled, the standard practice is to force the sub-path closed by connecting its end and start points with an implicit line segment, thereby closing the sub-path, and then filling that resulting closed path.

While the meaning of "inside a path" generally matches the intuitive meaning of this phrase, path rendering formalizes this notion with what is called a fill-rule. The intuitive sense of "inside" is sufficient as long as a closed sub-path does not self-intersect itself. However if a sub-path intersects itself or another sub-path or some sub-paths are fully contained within other sub-paths, what it means to be inside or outside the path needs to be better specified.

Stroking is distinct from filling and is more analogous to tracing or outlining each sub-path in a path as if with a pen or marker. Stroking operates on the perimeter or boundary defined by the path whereas filling operates on the path's interior. Unlike filling, there is no requirement for the sub-paths within a path to be closed for stroking. For example, the curve of a letter "S" could be stroked without having to be closed though the curve of the letter "O" could also be stroked.

FIG. 1C is a prior art scene composed of the sequence of paths from FIG. 1A with the stroking from FIG. 1A and the filling from FIG. 1B. FIG. 1C shows how filling and stroking are typically combined in a path rendering scene for a complete the scene. Both stroking and filling are integral to the scene's appearance.

Traditionally, graphics processing units (GPUs) have included features to accelerate 2D bitmapped graphics and three-dimensional (3D) graphics. In today's systems, nearly all path rendering is performed by a central processing unit (CPU) performing scan-line rendering with no acceleration by a GPU. GPUs do not directly render curved primitives so path rendering primitives such as Bèzier segments and partial elliptical arcs must be approximated by lots of tiny triangles when a GPU is used to render the paths. Constructing the required tessellations of a path that is approximated by many short connected line segments can create a substantial CPU burden. The triangles or other polygons resulting from tessellation are then rendered by the GPU. Because GPUs are so fast at rasterizing triangles, tessellating paths into polygons that can then be rendered by GPUs is an obvious approach to GPU-accelerating path rendering.

Tessellation is a fragile, often quite sequential, process that requires global inspection of the entire path. Tessellation depends on dynamic data structures to sort, search, and otherwise juggle the incremental steps involved in generating a tessellation. Path rendering makes this process considerably harder by permitting curved path segments as well as allowing path segments to self-intersect, form high genus topologies, and be unbounded in size.

A general problem with using a GPU to render paths is unacceptably poor antialiasing quality when compared to standard CPU-based methods. The problem is that GPUs rely on point sampling for rasterization of triangular primitives with only 1 to 8 samples (often 4) per pixel. CPU-based scan-line methods typically rely on 16 or more samples per pixel and can accumulate coverage over horizontal spans.

Animating or editing paths is costly because it requires re-tessellating the entire path since the tessellation is resolution dependent, and in general it is very difficult to prove a local edit to a path will not cause a global change in the tessellation of the path. Furthermore, when curved path segments are present and the scaling of the path with respect to pixel space changes appreciably (zooming in say), the curved path segments may need to be re-subdivided and re-tessellation is likely to be necessary.

Additionally, compositing in path rendering systems typically requires that pixels rasterized by a filled or stroked path are updated once-and-only-once per rasterization of the path. This requirement means non-overlapping tessellations are required. So for example, a cross cannot be tessellated as two overlapping rectangles but rather must be rendered by the outline of the cross, introducing additional vertices and primitives. In particular, this means the sub-paths of a path cannot be processed separately without first determining that no two sub-paths overlap. These requirements, combined with the generally fragile and sequential nature of tessellation algorithms make path tessellation particularly expensive. Because of the expense required in generating tessellations, it is very tempting and pragmatic to cache tessellations. Unfortunately such tessellations are much less compact than the original path representations, particularly when curved path segments are involved. Consequently, a greater amount of data must be stored to cache paths after tessellation compared with storing the paths prior to tessellation.

Conventional stroking has been performed by approximating paths into sub-pixel linear segments and then tracing the segments with a circle having a diameter equal to a stroke width. Offset curves are generated at the boundary of the stroked path. These offset curves are typically of much higher degree of complexity compared with the linear segments that are traced to generate the stroked path. Determining whether or not each pixel is inside or outside of a stroked path to generate the stroking is mathematically complex. Identification of the pixels to be stroked is equivalent to identifying pixels that are within half of the stroke width of any point along the path to be stroked. More specifically, the pixels to be stroked are within half of the stroke width measured along a line that is perpendicular to the tangent of the path segment being stroked.

The tangent of a sub-path is not necessarily well-defined at junctions between path segments. So additional rules are needed to determine what happens at and in the vicinity of such junctions as well as what happens at the terminal (start and end) points of sub-paths. Therefore stroking specifies further stroking rules to handle these situations.

In standard path rendering systems, paths are specified as a sequence of cubic and quadratic (non-rational) Bèzier curve segments, partial elliptical arcs, and line segments. While more mathematically complex path segments representations could be used to specify paths, in practice, existing standards limit themselves to the aforementioned path segment types.

Path filling and stroking use the same underlying path specification. For filling, this means the resulting piece-wise boundaries to be filled may be up to third-order (in the case of cubic Bèzier segments) or rational second-order (in the case of partial elliptical arcs). Filling these curved boundaries of Bèzier curves and arcs is clearly harder than filling the standard polygonal primitives in conventional polygonal 2D or 3D rendering where the boundaries (edges) of the polygonal primitives (usually triangles) are all first-order, being linear segments, and often required to be convex. Filling (and stroking) are also harder than conventional line and convex polygon rasterization because paths are unbounded in their complexity whereas line segments and triangles are defined by just 2 or 3 points respectively. A path may contain just a single path segment or it could contain thousands or more.

The boundaries of stroked paths are actually substantially higher order than the third-order segments. The offset curve of non-rational (second-order) quadratic and (third-order) cubic Bèzier curves are eighth- and tenth-order curves respectively. This high order makes exact determination and evaluation of the resulting offset curves for such Bèzier segments intractable for use in direct rendering. In other words, it is quite unreasonable to try to determine exactly the boundary representation of such offset curves and then simply fill them. For this reason, various techniques have been developed to approximate offset curves with sequences of Bèzier, arc, or line segments. These approximate stroke boundaries may then be filled.

FIG. 1D illustrates prior art exterior stroke offset curves for various stroke widths of a generating path 200. Observe in FIG. 1D how as the stroke width radius increases, the respective offset curves 207 for each different stroke width exhibit self-intersections 222 and cusps 223. The exterior stroke offset curves are higher-order curves compared with the generating path 200. FIG. 1E illustrates interior stroke offset curves for various stroke widths of a generating path 221. The interior stroke bounding curves are higher-order curves compared with the generating path 221. Observe in FIG. 1E how offset curves with a small radius leave a topological hole inside the generating path 221. As the radius increases with each wider radius, the hole splits into two holes. The largest radius shown fills in the hole completely. These changes in the genus of the region bounded by offset curves and the emergence of tangent discontinuities on the boundary of wide offset curves illustrate some of the difficulties associated with exact rasterization of stroked paths.

The idea that stroking is "harder" than filling is a bit unintuitive when filling and stroking are considered on an intuitive, artistic level. An artist typically thinks of stroking as a form of sketching or outlining whereas filling requires "coloring in between the lines." In typical rasterized path rendering scenes, most of pixels tend to be painted by filling rather than stroking so there is a sense that more effort is expended to perform the filling simply because more pixels were painted by filling.

This intuition seems to be further validated when one appreciates that evaluating the fill-rule required for proper filling requires a global view of the entire path. Just because a pixel appears to be inscribed within a particular loop of a path does not mean the pixel should be painted because the path might contain another loop with the opposite winding order that all inscribes that pixel. Certainly there are very intricate paths where determining whether a pixel filled by such an intricate path is quite involved; however most paths, in practice, are often reasonably simple (meaning non-self-intersecting and topologically genus zero).

However this naïve intuition that filling might be easier is misleading; proper stroking is hard because of the mathematical complexity of the boundary of a path's stroke compared to a path's fill. While approximations to the actual stroke boundary can reduce this complexity, such approximations have associated costs due to inaccuracy and the resulting expansion in the number of primitives that must be both stored and processed to render such approximated strokes. For example, the stroke of a quadratic Bèzier segment can be represented with just the segment's 3 control points (along with the per-path stroke width) whereas an approximation of this stroked boundary with line segments might require dozens or even hundreds of triangles to tessellate approximately the stroked region. Indeed the quality of such tessellations depends on the projection of the curved segment to screen-space; this means rendering the same stroked curve at different resolutions would necessitate different tessellations.

Accordingly, what is needed in the art is an improved system and method for approximating stroked higher-order curved segments using quadratic segments.

SUMMARY OF THE INVENTION

One embodiment of the present invention sets forth a technique for approximating higher-order curved segments with quadratic Bèzier curve segments. Cubic Bèzier path segments are approximated with quadratic Bèzier curve segments and other lower-order segments. A variance metric is computed for each quadratic Bèzier curve segment, and when the variance metric indicates that the quadratic Bèzier curve segment deviates by more than a threshold from the corresponding portion of the cubic Bèzier path segment, the cubic Bèzier curve segment is subdivided into multiple quadratic Bèzier curve segments. The path composed of the quadratic Bèzier curve segments may then be stroked by rendering hull geometry that encloses the path. A technique for rasterizing stroked quadratic Bèzier segments is described in patent application titled, "Point Containment for Quadratic Bèzier Strokes," filed on Apr. 29, 2011 and having Ser. No. 13/097,993.

Various embodiments of a method of the invention for approximating stroked higher-order curved segments with quadratic Bèzier curve segments include receiving a path including a cubic Bèzier path segment and computing endpoint positions and tangents for the cubic Bèzier path segment. An approximating quadratic Bèzier curve segment is fitted to the endpoint positions and tangents computed for the cubic Bèzier path segment and the method determines whether the approximating quadratic Bèzier curve segment is accurate based on a variance metric. Other embodiments may apply a similar approximating approach to partial elliptical arcs. An approximated path that includes the approximating quadratic Bèzier curve segment is stroked.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1A:
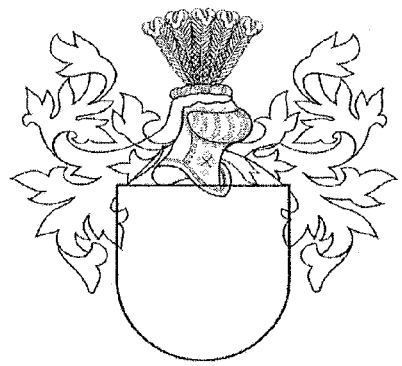
FIG. 1A is a prior art scene composed of a sequence of stroked paths.
Figure 1B:
FIG. 1B is the fill for the prior art scene shown in FIG. 1A.
Figure 1C:
FIG. 1C is the prior art scene of FIG. 1A with the fill of FIG. 1B and the stroked sequence of paths.
Figure 1D:
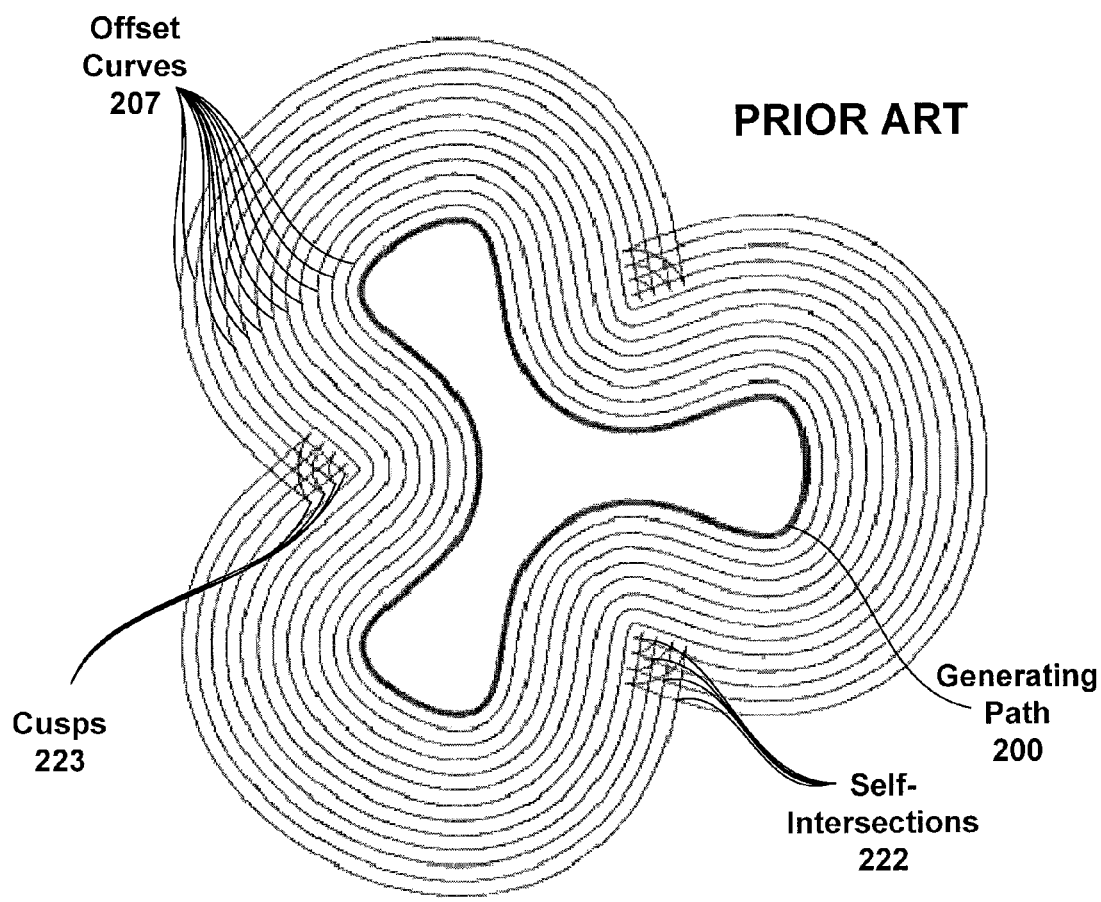
FIG. 1D illustrates prior art exterior stroke bounding curves for various stroke widths of a generating path.
Figure 1E:
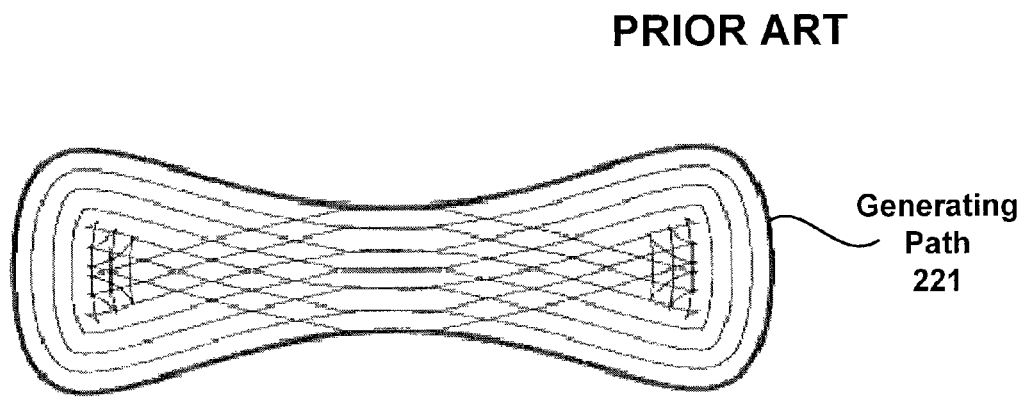
FIG. 1E illustrates prior art interior stroke bounding curves for various stroke widths of a generating path.
Figure 2A:
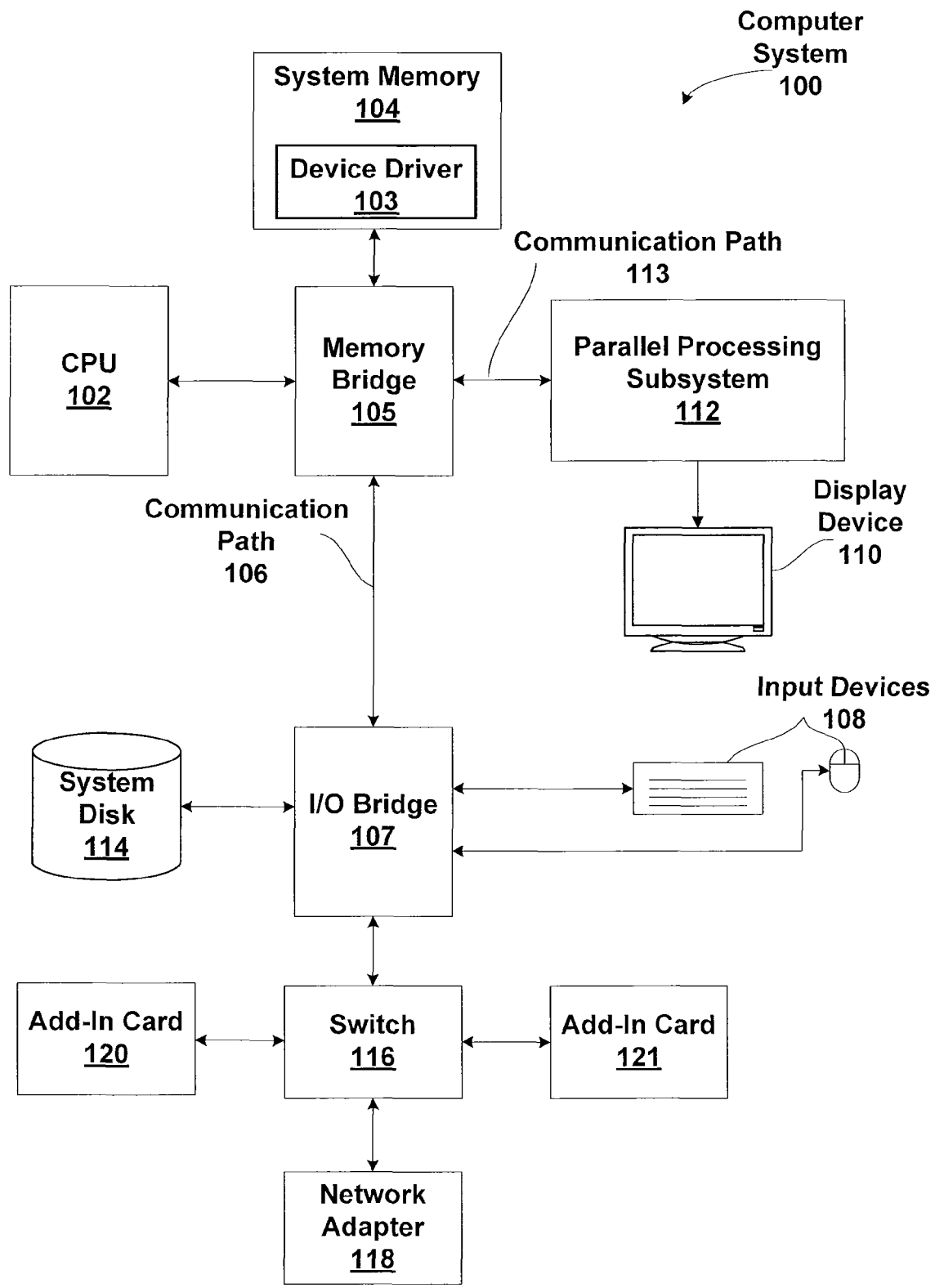
FIG. 2A is a block diagram illustrating a computer system configured to implement one or more aspects of the present invention.

FIG. 2A is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 2A may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2B:
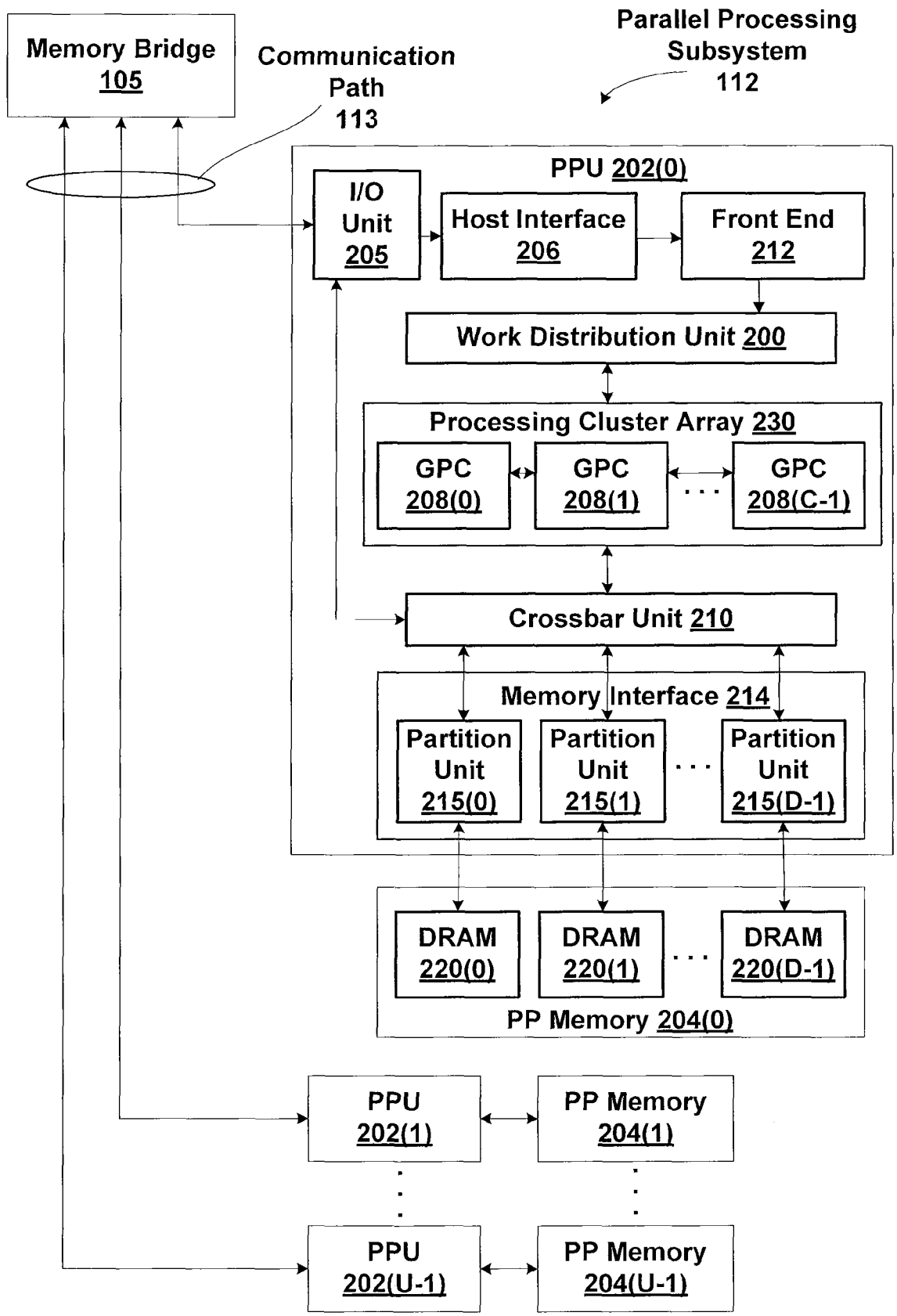
FIG. 2B is a block diagram of a parallel processing subsystem for the computer system of FIG. 2A, according to one embodiment of the present invention.

FIG. 2B illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 2A, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 2A or FIG. 2B) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2B, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
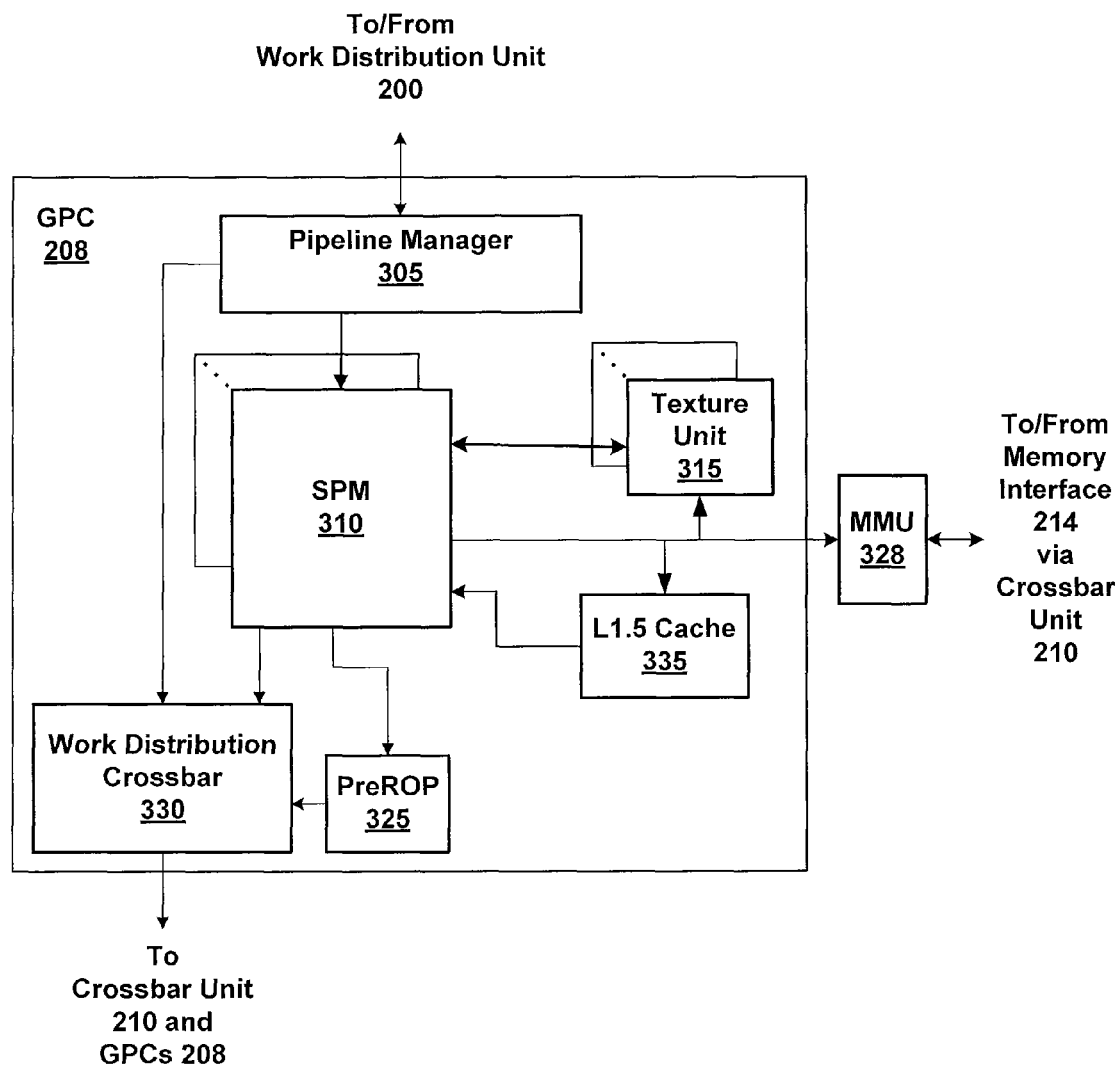
FIG. 3A is a block diagram of a GPC within one of the PPUs of FIG. 2B, according to one embodiment of the present invention.

FIG. 3A is a block diagram of a GPC 208 within one of the PPUs 202 of FIG. 2B, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., execution and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
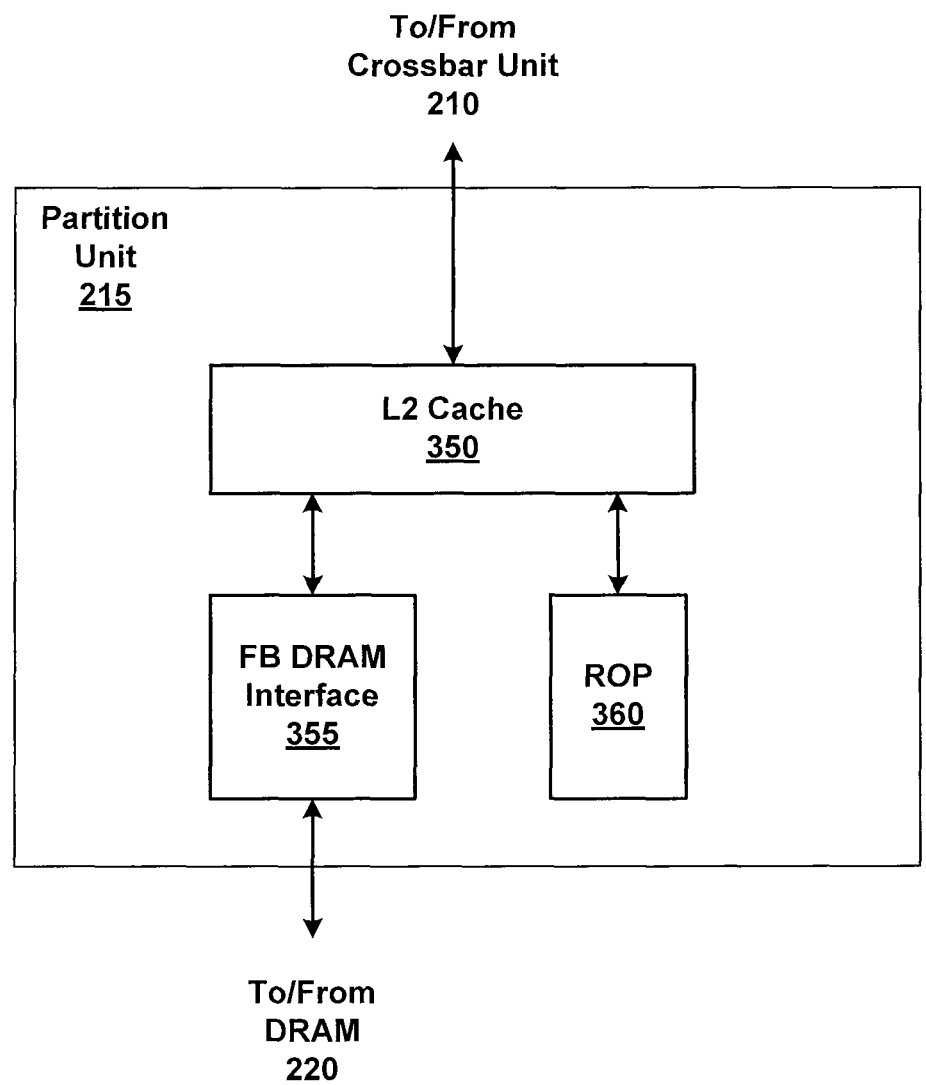
FIG. 3B is a block diagram of a partition unit within one of the PPUs of FIG. 2B, according to one embodiment of the present invention.

FIG. 3B is a block diagram of a partition unit 215 within one of the PPUs 202 of FIG. 2B, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 2A, 2B, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
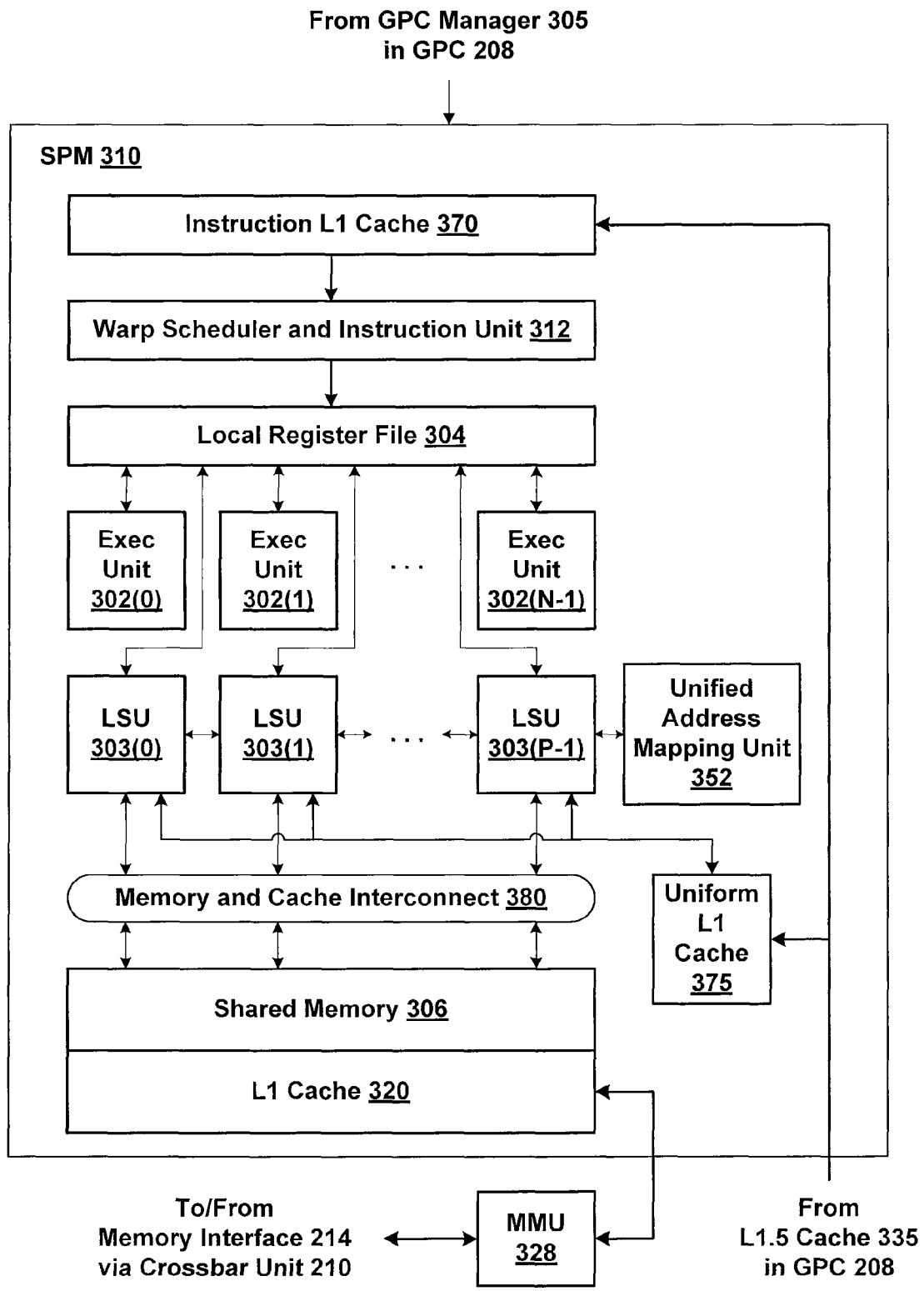
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Graphics Pipeline Architecture

Figure 4:
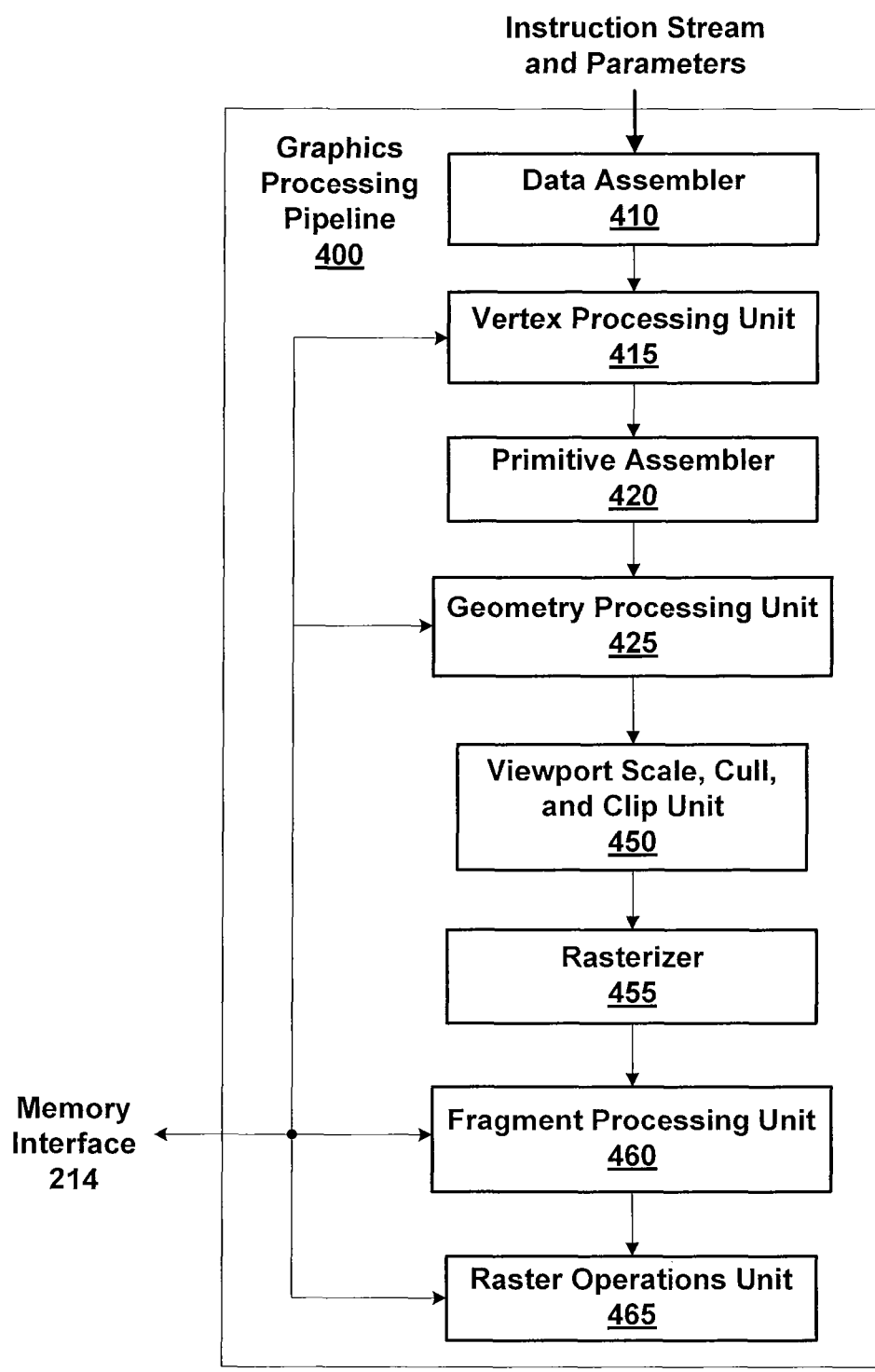
FIG. 4 is a conceptual diagram of a graphics processing pipeline that one or more of the PPUs of FIG. 2B can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Approximating Stroked Curved Segments

Path stroking has an associated "stroke width" that defines the region that is included in the stroke when a circle having a diameter of the stroke width is moved along the path segment. The path segment is considered a generating curve and the circle generates an inside offset curve and an outside offset curve as the circle moves along the path segment. Mathematical computation of the inside and the outside offset curves is difficult. Because stroking is an important operation for many application programs that produce 2D images, it is desirable to accelerate stroking operations. In one embodiment, a GPU, such as the PPU 202, may be used to perform functions to accelerate stroking operations. Importantly, tessellation of the path segments is avoided. Instead, a path is approximated by quadratic Bèzier curve segments or segments of lower complexity, e.g., arcs, line segments, and the like.

The GPU-accelerated stroking technique for rasterizing stroked quadratic Bèzier segments described in patent application titled, "Point Containment for Quadratic Bèzier Strokes," filed on Apr. 29, 2011 and having Ser. No. 13/097,993 typically perform approximately 1 to 2 orders of magnitude more fragment processing operations per sample than comparable GPU-accelerated techniques for filling paths. This relative expense is justified because it results in fewer approximations and a more compact and resolution-independent representation from which to render stroked paths. The observation that more rendered pixels are filled than stroked in typical path rendering scenes with both types of path rendering also helps balance the relatively higher per-sample cost of stroking to filling.

Figure 5A:
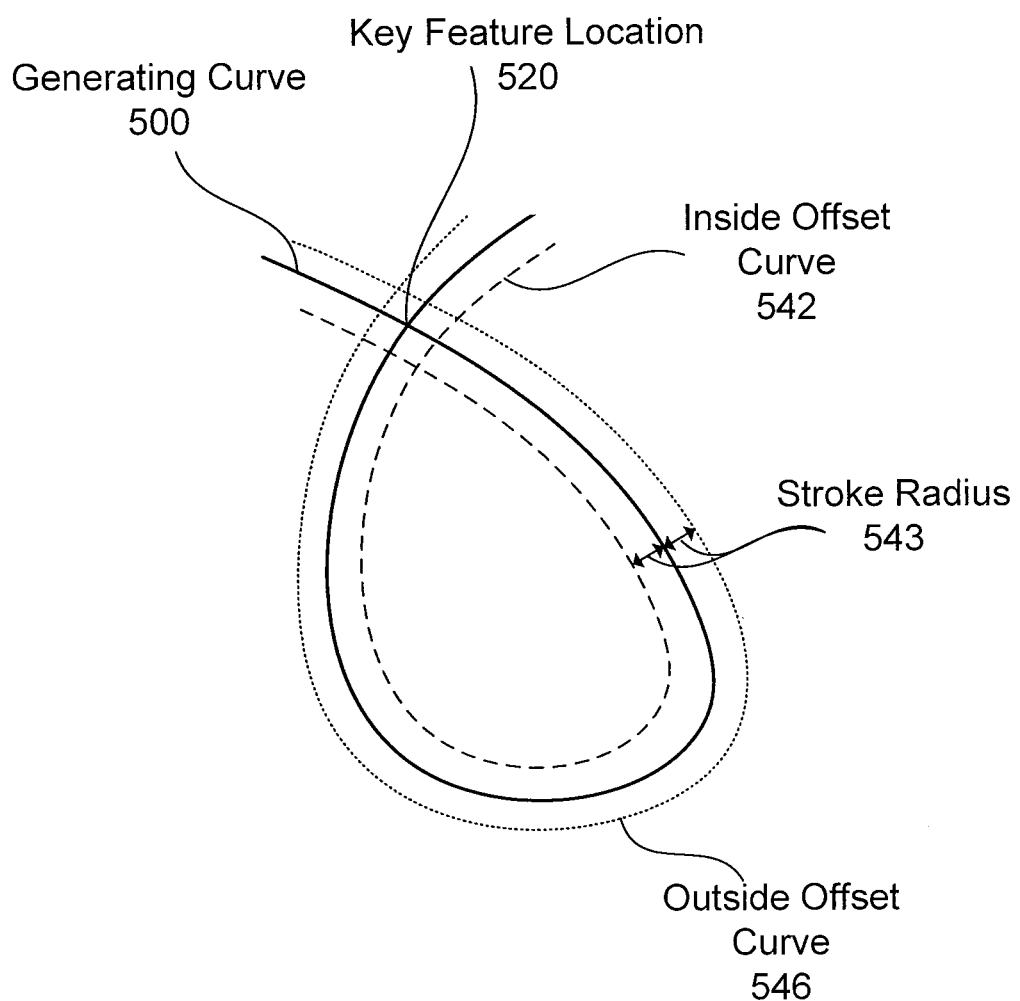
FIG. 5A illustrates a path that may be represented as a sequence of quadratic Bèzier path segments and stroked, according to one embodiment of the invention.

FIG. 5A illustrates a generating curve 500 that may be approximated by a sequence of quadratic Bèzier path segments and stroked, according to one embodiment of the invention. A stroke width having a constant stroke radius 543 defines a corresponding inside offset curve 542 and a corresponding outside offset curve 546 of the stroked generating curve 500 that are separated from the generating curve 500 by the constant distance of the stroke radius 543. First, the generating curve 500 is approximated by quadratic Bèzier path segments, partial circles, and line segments. Approximating a path with quadratic Bèzier curve segments, partial circles, and/or line segments produces a geometry set that is suitable for stroking rendered paths containing higher-order curved segments, such as cubic Bèzier and partial elliptical arc path segments, without tessellating the path.

More specifically, a stroking engine approximates the higher-order curved segments into quadratic Bèzier curves so that the initial and terminal tangents are matched by the resulting sequence of quadratic Bèzier segments, partial circles, and line segments and the continuity of the tangents is also preserved at each shared endpoint. When an approximating quadratic Bèzier curve does not accurately represent the originating higher-order curve segment of the path, the stroke engine divides the higher-order curve segment into multiple quadratic Bèzier path segments. The stroke engine limits the subdivision into path segments based on the stroke width, so that the stroke boundary does not expose the boundary of the generating curve. In order to maintain geometrically important features of the curve and continuity of the tangents, key features such as the self-intersection that occurs at the key feature location 520 of the generating curve 500 are identified during the subdivision process. The generating curve 500 is subdivided into two or more quadratic Bèzier curve segments at the key feature location 520. Other key features include cusps and points of maximum curvature. When the key feature is a cusp within some segment of the generating curve, generating a partial circle centered at the cusp location ensures the curve's stroke contains all the points within a stroke radius of this cusp.

The quadratic Bèzier curve segments, partial circles, and line segments generated during the subdivision process to approximate the generating curve 500 are processed to determine whether or not points lie within the stroke region of each quadratic Bèzier curve segment, arc, or line segment. Rather than computing the inside and outside offset curves, a function is evaluated for each point that may be within the stroke region that is bounded by the inside offset curve 542 and the outside offset curve 546. The function is specific to the point, so that each point has a respective function. Points that lie within the stroke region are then stroked to produce a stroked path. In the case of a path consisting of multiple segments, a point belongs to the path's stroke if the point is within the stroke of any segment belonging to the path.

Bèzier curves are defined by control points. In the 2D content of path rendering, each control point is a 2D position. Curved path segments for a path may be generated by path commands for quadratic Bèzier curves, cubic Bèzier curves, and partial elliptical arcs.

A quadratic Bèzier curve is specified by 3 control points and a cubic Bèzier curve is specified by 4 control points. The QUADRATICTO command uses the terminal position of the prior command as its initial control point (x0,y0) and then 4 associated coordinates form the two new (x1,y1) and (x2,y2) control points. The quadratic Bèzier curve starts at (x0,y0) heading towards (x1,y1) and ends at (x2,y2) as if coming from (x1,y1). Despite (x1,y1) providing the initial tangent direction when starting from (x0,y0) and terminating at (x2, y2), the resulting curve does not pass through (x1,y1); for this reason, (x1,y1) is known as an extrapolating control point while (x0,y0) and (x2,y2) are known as interpolating control points.

The CUBICTO command is similar to the QUADRATICTO command but generates a cubic Bèzier curve. Such a curve is specified by 4 control points. The CUBICTO command uses the terminal position of the prior command as its initial control point (x0,y0) and then 6 associated coordinates form the 3 new (x1,y1), (x2,y2), and (x3,y3) control points. The cubic Bèzier curve starts at (x0,y0) heading towards (x1,y1) and ends at (x3, y3) as if coming from (x2,y2). While a quadratic Bèzier curve has a single extrapolating control point, cubic Bèzier curves have two extrapolating control points, (x1,y1) and (x2,y2). A cubic Bèzier curve has the freedom, unlike a quadratic Bèzier curve, to specify arbitrary initial and terminal tangent directions for its end-points. This control makes cubic Bèzier curves popular with artists. This additional control comes from the curve being described by a third-order bivariate polynomial equation instead of a second-order equation in the case of a quadratic Bèzier curve (and first-order in the case of line segments).

Figure 5B:
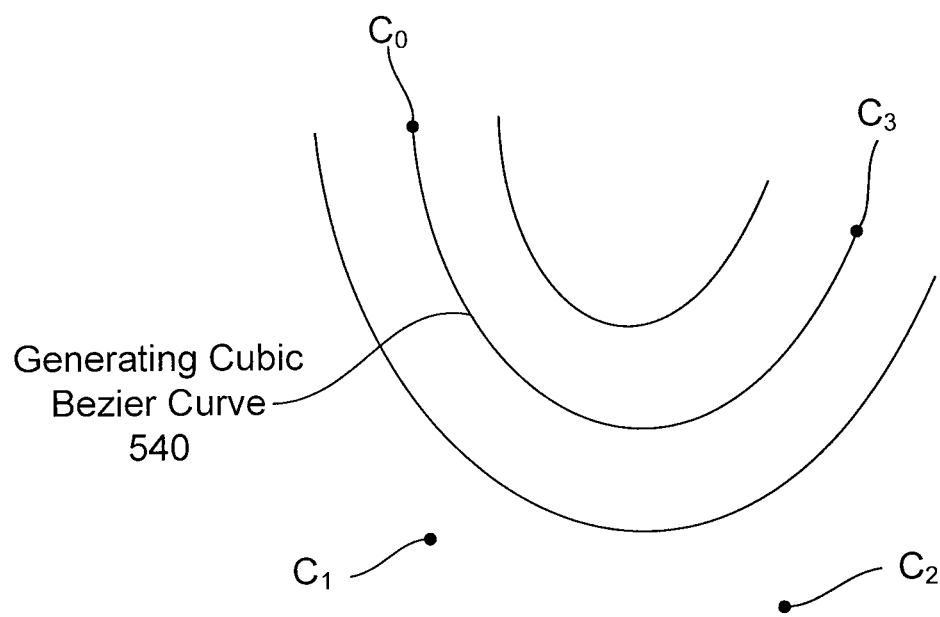
FIG. 5B illustrates a generating cubic Bèzier curve, control points, and corresponding inside and outside edges of the stroked generating cubic Bèzier curve, according to one embodiment of the invention.

FIG. 5B illustrates a generating cubic Bèzier curve 540, control points $C_0$, $C_1$, $C_2$, and $C_3$, and corresponding inside and outside edges of the stroked generating cubic Bèzier curve, according to one embodiment of the invention.

The cubic Bèzier curve 540 with control points $C_0$, $C_1$, $C_2$, and $C_3$ can be approximated by a quadratic Bèzier segment that shares the same end-points positions ($C_0$ and $C_3$) and normalized tangents ($T_0$ and $T_3$). In this case, the quadratic Bèzier curve segment has the control points $C_0$, $C_{mid}$, and $C_3$ where $C_{mid}$ is $$C_{mid} = C_0 + \frac{\begin{vmatrix} C_1 - C_0 \\ T_3 \end{vmatrix}}{\begin{vmatrix} T_0 \\ T_3 \end{vmatrix}}(C_1 - C_0) \quad \text{(equation 1)}$$

where $$T_0 = \frac{C_1 - C_0}{\sqrt{(C_1 - C_0) \cdot (C_1 - C_0)}} \quad \text{(equation 2)}$$

$$T_3 = \frac{C_3 - C_2}{\sqrt{(C_3 - C_2) \cdot (C_3 - C_2)}}$$

Notice these equations will result in division by zero if $C_0$ and $C_1$ are co-located, $C_2$ and $C_3$ are co-located, or $T_0$ and $T_3$ are coincident. These are all situations that can occur when 3 or more control points of the cubic Bèzier segment are collinear. In order to avoid these collinear situations or very nearly collinear control points (i.e., within a collinear threshold), such cubic Bèzier segments should be replaced with line segments appropriately.

Figure 5C:
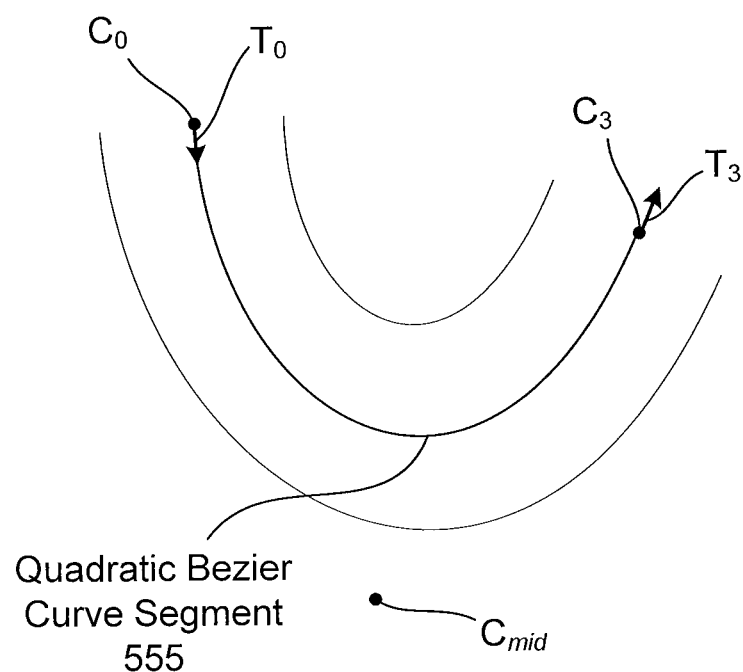
FIG. 5C illustrates a quadratic Bèzier curve segment that is approximates a generating cubic Bèzier curve, according to one embodiment of the invention.

FIG. 5C illustrates a quadratic Bèzier curve segment 555 that approximates the generating cubic Bèzier curve shown in FIG. 5B, according to one embodiment of the invention. The quadratic Bèzier curve segment 555 shares the same end-point positions ($C_0$ and $C_3$) and normalized tangents ($T_0$ and $T_3$) as the generating cubic Bèzier curve 540 and has the control points $C_0$, $C_{mid}$, and $C_3$.

A variance metric V between the cubic Bèzier curve 540 and the approximating quadratic Bèzier curve segment 555 with matching tangent end-points directions is computed as $$V = \frac{\begin{array}{l} C_0 \cdot (2C_0 - 12C_1 - 9C_2 + 3C_3 + 14C_{mid}) + \\ C_1 \cdot (18C_1 + 27C_2 - C_3 - 42C_{mid}) + \\ C_2 \cdot (18C_2 - 12C_3 - 42C_{mid}) + \\ C_3 \cdot (2C_3 + 14C_{mid}) + \\ 28C_{mid} \cdot C_{mid} \end{array}}{210} \quad \text{(equation 3)}$$

The variance is the square of the deviation between the cubic curve and its approximating quadratic form. Hence a deviation value computed as the square root of V divided by an approximation of the arc length of the cubic Bèzier curve 540 is comparable to the displacement of the approximating quadratic Bèzier curve segment 555 compared with the cubic Bèzier curve 540. Other variance metrics are possible, but equation 3 minimizes in a least squares sense the difference between corresponding parametric positions on the cubic Bèzier segment and its approximating quadratic Bèzier segment. The deviation value may be compared to the stroke width to quantify the accuracy of the approximating quadratic Bèzier curve segment 555. When the deviation value is not within a tolerance threshold, the cubic Bèzier curve segment 540 is subdivided into two cubic Bèzier curve segments using the well-known De Casteljau algorithm for splitting Bèzier curves. The two new cubic Bèzier curve segments are again fitted to their respective approximate quadratic Bèzier segment (essentially treating them as a new generating cubic Bèzier curve 540. This process of subdivision continues until the variance metric is satisfied or some maximum subdivision limit is reached. The geometric tangent (G1) continuity at a shared endpoint of the two new quadratic Bèzier curve segments is maintained; this ensures even under extremely magnified or zoomed viewing there is never any apparent loss of curved appearance along the curved stroke segment's boundary, in contrast to the prior art's use of line segments. In one embodiment, a cubic Bèzier curve may be subdivided into a number of quadratic Bèzier curve segments based on the size of the stroke width. For example, the number may increase as the stroke width decreases and decrease as the stroke width increases.

Following subdivision into approximating quadratic Bèzier curve segments, a point containment algorithm may be used to determine whether a point is "inside" or "outside" the stroke region of a path. Applying a point containment algorithm to each and every sample that is potentially within the boundary defined by the path or stroked boundary is fundamental to the process of stroking a rendered path.

Figure 5D:
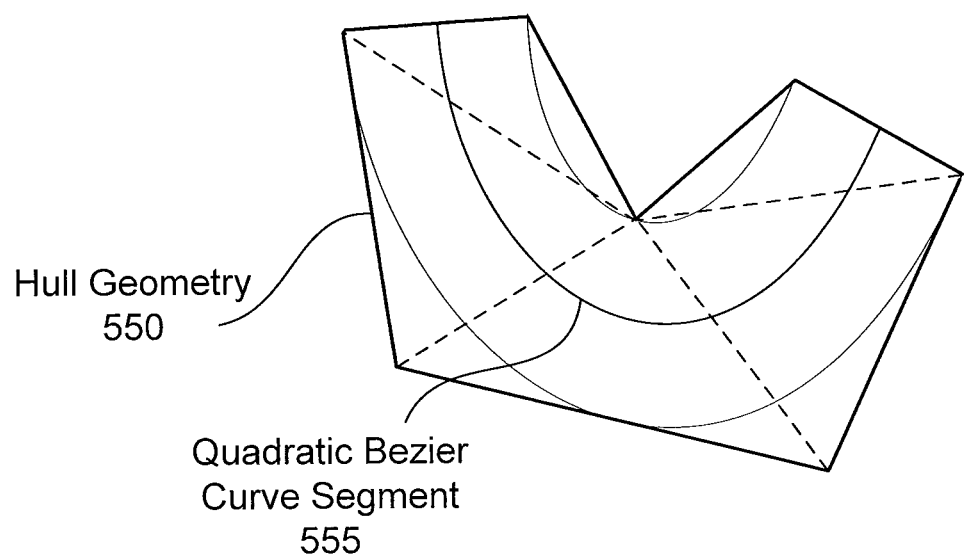
FIG. 5D illustrates the quadratic Bèzier curve segments of FIG. 5C and conservative bounding hull geometry, according to one embodiment of the invention.

For each quadratic Bèzier path segment, the stroking engine generates a conservative hull polygon that completely encloses a stroke region of the quadratic Bèzier path segment. FIG. 5D illustrates the quadratic Bèzier curve segment 555 of FIG. 5C and conservative bounding hull geometry 550, according to one embodiment of the invention. The stroking engine then computes a set of derived values from each quadratic Bèzier path segment and the stroke width to facilitate an efficient computation of nearest points on the quadratic Bèzier path segment to a point that may be within the stroke region. When a GPU is used to perform the stroking operations, the derived values may be stored in a texture or texture buffer object and ordered to correspond with their respective quadratic Bèzier curve segment's convex hull geometry. Miter join styles between cubic Bèzier segments are added with conventional triangles.

The tangent of a sub-path is not necessarily continuous at junctions between quadratic Bèzier curve segments. So additional rules are needed to determine what happens at and in the vicinity of such junctions as well as what happens at the terminal (start and end) points of sub-paths. Therefore stroking specifies further stroking rules to handle these situations. A join style determines what happens at the junction between two connected path segments. Typical join styles are round, miter, and bevel. An end-cap style indicates what happens at the end points of open (non-closed) sub-paths. Typical end-cap styles are round, square, none, and triangle. If the sub-path is closed, the join style is used to connect the initial and terminal segments rather than using end caps.

Therefore, points may belong to the path's stroke based on additional end-cap and join-style point containment tests. Round end-cap and join-style tests depend on whether the point is within r units of the path's end-points or segment join points. The miter and bevel join-styles depend on the normalized tangent directions of the initial or terminal points of the path. The miter and bevel join-styles depend on the two normalized tangent directions when two path segments join at a segment join point. For a mitered join, if the cosine of the angle between the tangent directions exceeds the miter-limit, the miter is treated as either a bevel or truncated miter.

In addition to the hull geometry bounding the quadratic Bèzier curve segments, the stroking engine also collects or generates a set of polygonal geometry for any square or triangular end-caps or mitered or beveled join styles. The stroking engine also collects or generates a set of polygonal geometry for rounded stroking with associated coordinates to generate round end-caps, join styles, and hemi-circles for cusps of curved segments converted to line segments. This geometry may include texture coordinates indicating vertex position relative to the junction, end-point, or cusp. Cusps on segments of the generating curve are identified by the stroke engine as key features so that a generating curve such as a cubic Bèzier segment containing a cusp will be subdivided into quadratic cubic Bèzier curve segments on either side of the cusp location. In order to include the full set of stroke locations within a stroke radius of such cusp locations, the stroke engine should add a partial circle centered at such cusp locations with a radius equal to the stroke radius to the curve's set of approximating geometry.

Figure 6A:
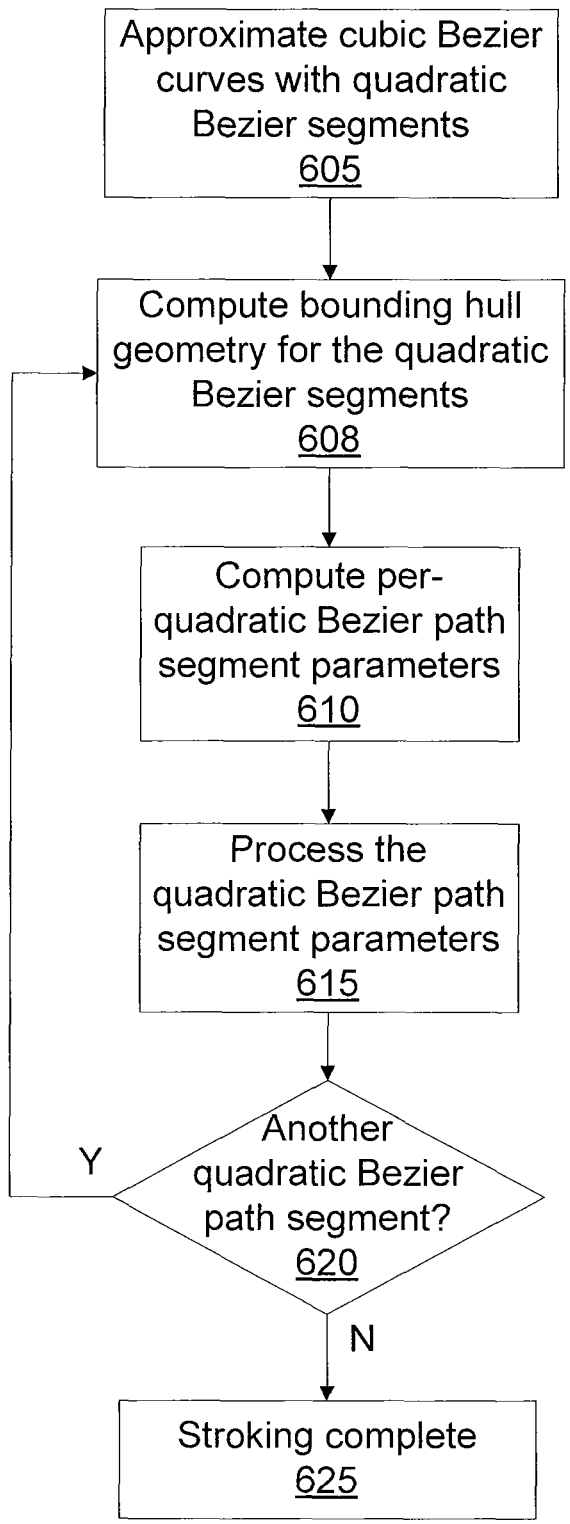
FIG. 6A is a flow diagram of method steps for stroking a path including cubic Bèzier segments, according to one embodiment of the present invention.

This same process can be used to decompose other higher-order curved segments into a sequence of quadratic Bèzier curves, partial circles, and line segments. In particular, partial elliptical arcs can be decomposed by using the procedure above where the initial and terminal control points are the start and stop positions of the arc and the tangent vectors of the arc at its end points can be used to generate extrapolating control points of a cubic Bèzier curve to serve as a proxy for the arc. When splitting is required, the curve to split should be the generating higher-order curve is required, FIG. 6A is a flow diagram of method steps for stroking a path including cubic Bèzier segments, according to one embodiment of the present invention. Although the method steps are described in conjunction with the systems of FIGS. 2A, 2B, 3A, 3B, 3C, and 4, persons skilled in the art will understand that any system configured to perform the method steps, in any order, is within the scope of the inventions. The CPU 102 or parallel processing subsystem 112 may be configured to stroke a path that includes cubic Bèzier path segments, quadratic Bèzier path segments, line segments, and arcs. In one embodiment, the control points defining each path segment are sorted before that path segment is processed to avoid the generation of approximating quadratic Bèzier curve segments that are dependent on the path segment direction; this allows the path segment's stroke coverage to be invariant with direction of the stroke.

At step 605 a path segment including at least one cubic Bèzier path segment and stroke width is received by a path stroke engine and is approximated by one or more quadratic Bèzier curve segments. The path stroke engine may be embodied as an application program for execution by CPU 102 and/or parallel processing subsystem 112 or as circuitry configured to perform the method steps shown in FIG. 6A. The path stroke engine approximates cubic Bèzier curves and any higher order curves with quadratic Bèzier path segments and lower order path segments. The path stroke engine determines if each path segment is a degenerate line or within an epsilon of being so, and if it is, the path segment is approximated by a line segment. The path stroke engine also identifies line segments (including line segments generated by the path stroke engine from degenerate lines) in the path and converts the identified line segments to rectangles. The path stroke engine also identifies path commands for curved segments other than cubic Bèzier segments and converts such curved segments into an approximating sequence of quadratic Bèzier curves, as described in conjunction with FIG. 6B.

At step 608 bounding hull geometry is generated by the path stroke engine for the quadratic Bèzier path segment. At step 610 per-quadratic Bèzier path segment parameters computed by the path stroke engine. The per-quadratic Bèzier path segment parameters may be computed by the CPU 102. At step 615 the per-quadratic Bèzier path segment parameters are processed by the path stroke engine to determine which points are within the stroke region of each quadratic Bèzier path segment. The quadratic path segment stroke containment involves solving of a particular cubic equation for each point so this computation is typically considerably more expensive than the computations required to rasterize primitive such as rectangles or triangles. In one embodiment, the per-quadratic Bèzier path segment parameters are processed by a combination of a vertex shader program and a fragment shader program executed by the parallel processing subsystem 112.

At step 620 the path stroke engine determines if the path to be stroked includes another quadratic Bèzier path segment, and, if so, then steps 608, 610, and 615 are repeated. Otherwise, at step 625 stroking of the path is complete. In one embodiment, the fragment shader is configured to discard fragments not within the quadratic Bèzier path segment and thereby avoid writing a stencil buffer to indicate whether or not each pixel is within the stroke region of a path. One or more geometric hulls that conservatively cover the entire path are generated and rendered to fill the stroke region by writing the color based on the stencil buffer. In another embodiment, the stroke region is filled by writing the color buffer as the hull geometry for each quadratic Bèzier path segment is processed.

Figure 6B:
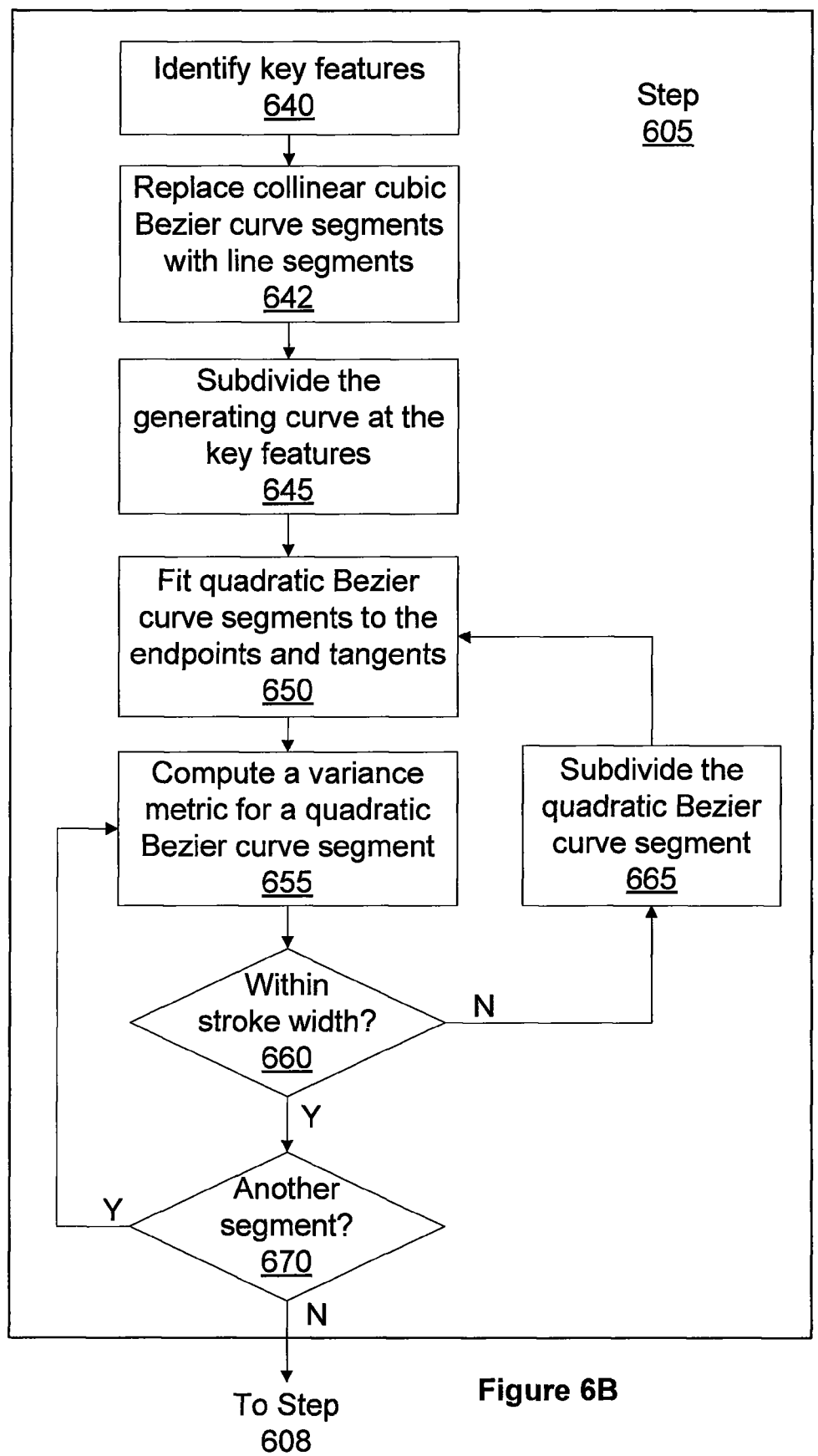
FIG. 6B is a flow diagram of method steps for processing cubic path segment parameters as performed in a method step shown in FIG. 8A, according to one embodiment of the present invention.

FIG. 6B is a flow diagram of method steps for approximating a curved path including a cubic Bèzier segment into one or more quadratic Bèzier curve segments as performed in method step 605 shown in FIG. 6A, according to one embodiment of the present invention. At step 640 the path stroke engine identifies key features of the path, e.g., locations of cusps, self-intersections, and points of maximum curvature. At step 642 the path stroke engine replaces collinear cubic Bèzier curve segments with line segments. At step 645 the path stroke engine subdivides the generating curve, i.e., path, at the key features.

At step 650 the path stroke engine fits quadratic Bèzier curve segments to the endpoints and tangents of the cubic Bèzier path segments included in the curve. Importantly, geometric tangent continuity is maintained during the fitting of the quadratic Bèzier curve segments. At step 655 the path stroke computes a variance metric and a deviation value that quantifies the accuracy of an approximating quadratic Bèzier curve segment. At step 660 the path stroke engine determines if the deviation value is within an acceptable tolerance based on the stroke width or a maximum number of subdivisions, and, if not, at step 665 the quadratic Bèzier curve segment is subdivided and steps 650, 655, and 660 are repeated for each new quadratic Bèzier curve segment. Otherwise, at step 670 the path stroke engine determines if another approximating quadratic Bèzier curve segment should be compared with the originating the cubic Bèzier path segment for accuracy. If another quadratic Bèzier curve segment should be compared, then the path stroke engine repeats steps 655 and 660. Otherwise, all of the approximating quadratic Bèzier curve segments meet the accuracy constraints and the path stroke engine proceeds to step 608.

Because the geometry set used to produce the stroked path is resolution-independent, the stroked path can be rasterized under arbitrary projective transformations without needing to revisit the construction of the geometry set. This resolution-independent property is unlike geometry sets built through a process of tessellating curved regions into triangles; in such circumstances, sufficient magnification of the filled path would reveal the tessellated underlying nature of such a tessellated geometry set. The approximating quadratic Bèzier curve segments are also compact, meaning that the number of bytes required to represent the stroked path is linear with the number of quadratic Bèzier path segments generated by original path. This property does not generally hold for tessellated versions of stroked paths where the process of subdividing curved edges and introducing tessellated triangles typically increases the size of the resulting geometry set considerably.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of approximating cubic Bèzier path segments, the method comprising:
   receiving a stroke width and a path including a cubic Bèzier path segment;
   computing a first endpoint position, a second endpoint position, a first tangent at the first endpoint, and a second tangent at the second endpoint for the cubic Bèzier path segment
   fitting an approximating quadratic Bèzier curve segment to the endpoint positions and tangents computed for the cubic Bèzier path segment;
   determining whether the approximating quadratic Bèzier curve segment is an accurate approximation of the cubic Bèzier path segment based on a variance metric; and
   stroking an approximated path including the approximating quadratic Bezier curve segment by:
     constructing a bounding hull geometry that encloses the approximating quadratic Bèzier curve segment;
     writing results to a stencil buffer indicating whether sample points within the bounding hull geometry are inside of a stroke region specified by the stroke width and the approximated path; and
     filling the stroke region by writing a color buffer using the results stored in the stencil buffer.

2. The method of claim 1, wherein the variance metric is based on the deviation between the cubic Bèzier path segment and the approximating quadratic Bèzier curve segment.

3. The method of claim 1, further comprising the steps of:
   identifying key features of the path; and
   subdividing the path at each key feature.

4. The method of claim 3, wherein the key features include one or more of a cusp point, a point of self-intersection, and a point of maximum curvature of the path.

5. The method of claim 1, further comprising subdividing the cubic Bèzier path segment into two or more quadratic Bèzier curve segments when the variance metric is not within a tolerance threshold.

6. The method of claim 1, further comprising the step of fitting a second approximating quadratic Bèzier curve segment to the first endpoint and a third endpoint while maintaining geometric tangent continuity with the first tangent.

7. The method of claim 1, further comprising replacing a collinear cubic Bèzier path segment of the path with a line segment.

8. The method of claim 1, wherein writing the results to the stencil buffer indicating whether the sample points within the bounding hull geometry are inside of the stroke region is performed by evaluating a point containment algorithm for each of the sample points.

9. The method of claim 8, wherein the point containment algorithm comprises a sample point-specific cubic equation.

10. The method of claim 9, wherein parameters of the sample point-specific cubic equation are computed based on the approximating quadratic Bèzier curve segment.

11. A non-transitory computer-readable storage medium storing instructions that, when executed by a processor, cause the processor to approximate cubic Bèzier path segments, by performing the steps of:
    receiving a stroke width and a path including a cubic Bèzier path segment;
    computing a first endpoint position, a second endpoint position, a first tangent at the first endpoint, and a second tangent at the second endpoint for the cubic Bèzier path segment
    fitting an approximating quadratic Bèzier curve segment to the endpoint positions and tangents computed for the cubic Bèzier path segment;
    determining whether the approximating quadratic Bèzier curve segment is an accurate approximation of the cubic Bèzier path segment based on a variance metric; and
    stroking an approximated path including the approximating quadratic Bèzier curve segment by:
        constructing a bounding hull geometry that encloses the approximating quadratic Bèzier curve segment;
        writing results to a stencil buffer indicating whether sample points within the bounding hull geometry are inside of a stroke region specified by the stroke width and the approximated path; and
        filling the stroke region by writing a color buffer using the results stored in the stencil buffer.

12. The non-transitory computer-readable storage medium of claim 11, wherein the variance metric is based on the deviation between the cubic Bèzier path segment and the approximating quadratic Bèzier curve segment.

13. The non-transitory computer-readable storage medium of claim 11, further comprising the steps of:
    identifying key features of the path; and
    subdividing the path at each key feature.

14. The non-transitory computer-readable storage medium of claim 13, wherein the key features include one or more of a cusp point, a point of self-intersection, and a point of maximum curvature of the path.

15. The non-transitory computer-readable storage medium of claim 11, further comprising subdividing the cubic Bèzier path segment into two or more quadratic Bèzier curve segments when the variance metric is not within a tolerance threshold.

16. The non-transitory computer-readable storage medium of claim 11, further comprising the step of fitting a second approximating quadratic Bèzier curve segment to the first endpoint and a third endpoint while maintaining geometric tangent continuity with the first tangent.

17. A system for approximate cubic Bèzier path segments, the system comprising:
    a memory that is configured to store a stroke width and a path including a cubic Bèzier path segment; and
    a processor that is coupled to the memory and configured to:
        receive the stroke width and the path including the cubic Bèzier path segment;
        compute a first endpoint position, a second endpoint position, a first tangent at the first endpoint, and a second tangent at the second endpoint for the cubic Bèzier path segment
        fit an approximating quadratic Bèzier curve segment to the endpoint positions and tangents computed for the cubic Bèzier path segment;
        determine whether the approximating quadratic Bèzier curve segment is an accurate approximation of the cubic Bèzier path segment based on a variance metric; and
        stroke an approximated path including the approximating quadratic Bèzier curve segment by:
        constructing a bounding hull geometry that encloses the approximating quadratic Bèzier curve segment;
        writing results to a stencil buffer indicating whether sample points within the bounding hull geometry are inside of a stroke region specified by the stroke width and the approximated path; and
        filling the stroke region by writing a color buffer using the results stored in the stencil buffer.

* * * * *